(12) United States Patent
Marcus et al.

(10) Patent No.: US 6,204,651 B1
(45) Date of Patent: Mar. 20, 2001

(54) METHOD AND APPARATUS FOR REGULATING AN OUTPUT VOLTAGE OF A SWITCH MODE CONVERTER

(75) Inventors: May Marcus; May Michael, both of Austin, TX (US)

(73) Assignee: Sigmatel, Inc., Austin, TX (US)

( * ) Notice: Subject to any disclaimer, the term of this patent is extended or adjusted under 35 U.S.C. 154(b) by 0 days.

(21) Appl. No.: 09/551,123

(22) Filed: Apr. 18, 2000

(51) Int. Cl.[7] .................................................... G05F 1/40
(52) U.S. Cl. ............................................. 323/283; 323/224
(58) Field of Search .................................. 323/283, 282, 323/224

(56) References Cited

U.S. PATENT DOCUMENTS

| | | | |
|---|---|---|---|
| 3,970,919 | * 7/1976 | Butcher et al. | 323/283 |
| 5,272,614 | * 12/1993 | Brunk et al. | 363/21 |
| 5,594,324 | * 1/1997 | Canter et al. | 323/282 |

OTHER PUBLICATIONS

MAX1705/MAX1706, "1– to 3–Cell, High Current, Low–Noise, Step–Up DC–DC Converters with Linear Regulator", MAXIM, Rev 0; Apr. 1997, pp. 1–20.*

* cited by examiner

*Primary Examiner*—Shawn Riley
(74) *Attorney, Agent, or Firm*—Timothy W Markison

(57) ABSTRACT

A method and apparatus for regulating a DC output voltage of a switch mode converter. The method and apparatus includes processing that begins by comparing a representation of the DC output voltage with a reference voltage to produce a digital stream of comparison data. The comparing is done at a given clock rate such that the digital stream of comparison data is produced at the corresponding clock rate. The processing then continues by interpreting the digital stream of comparison data to produce a digital stream of charged data and load data. The processing continues by interpreting the digital stream of charge data and load data to determine, for a given set of clock cycles, a charge signal and a load signal. The processing then continues by enabling charging of an external element (e.g., an inductor) in accordance with a charge signal for the given set of clock cycles. The processing further includes enabling discharging of the external elements to a load (e.g., a capacitor) in accordance with the load signal for the given set of clock cycles.

35 Claims, 6 Drawing Sheets

US 6,204,651 B1

METHOD AND APPARATUS FOR REGULATING AN OUTPUT VOLTAGE OF A SWITCH MODE CONVERTER

TECHNICAL FIELD OF THE INVENTION

This invention relates generally to power supplies and more particularly to regulating DC output voltages.

BACKGROUND OF THE INVENTION

As is known, all electronic devices that include integrated circuits require at least one DC voltage supply and typically requires multiple DC voltage supplies. A DC voltage supply may be generated from an AC voltage source (e.g., 110 volts AC) or from another DC voltage supply (e.g., a battery). To generate a DC voltage supply from an AC voltage, the AC voltage is processed in a controlled manner. For example, a switch-mode power supply will rectify the AC voltage to produce a DC bridge voltage. Using one of a plurality of switch mode converter topologies (e.g., full bridge, half bridge, buck, or boost) an inductor is charged and discharged at a controlled rate to produce a regulated DC voltage supply.

To regulate the DC voltage supply at the desired voltage, a feedback loop is used. Typically, a resistance divider network is coupled to the DC voltage supply to produce a representation of the DC output that is provided to a controlled circuit. The control circuit includes an operational amplifier, a saw tooth generator, and a comparator. The operational amplifier receives the representation of the DC output and a reference voltage to produce, therefrom, an error signal. The comparator receives the error signal and a saw tooth signal, which is produced from the saw tooth generator, and produces, therefrom, a pulse width modulation signal. The pulse width modulation signal controls the charging and discharging of the inductor. Depending on the overall gain of the power supply, the DC output can be regulated within a few mVolts.

Thus, when only one DC output voltage is needed, a well-regulated power supply system as described above may be used. When multiple DC output voltages, or supplies, are needed, design choices must be made to optimize the performance of the multiple output power supply. If power consumption is not a significant issue, but well-regulated multiple DC output is, then linear regulators may be used with reference to a primary DC output supply. For example, assume that a five-volt and three-volt DC outputs are needed where the five volt is being produced by a switch mode power supply. To produce the three volts supply, a linear regulator is coupled to the five volts supply and regulated to three volts. While the linear regulator will accurately produce the three-volt output, it is inefficient since that for every three watts of output power produced, two watts are consumed.

In an alternate design choice, if power consumption is a critical factor, but regulation of auxiliary supplies, (e.g., the three volts in the preceding example) is not a critical factor, then a multi-tap transformer may be used in place of the inductor. A secondary tap on the transformer produces the auxiliary DC output and a primary tap produces the primary DC output. In this embodiment, only the primary output is regulated. Thus, as the load varies on the primary DC output, the auxiliary DC output will vary by as much as ten percent (10%).

In designs where both power consumption and well-regulated multiple outputs are significant factors, DC to DC converters are used. As is known, a DC to DC converter includes its own inductor and control circuit to regulate a DC output from a DC input. Thus, multiple inductors and multiple control circuits are needed. As with most electrical devices, size and cost are concerns. Thus, having multiple DC to DC converters to produce regulated power supply voltages is prohibitive to reducing size and reducing costs of such devices.

Therefore, a need exists for a method and apparatus of regulating DC output supplies without the above-referenced limitations.

DETAILED DESCRIPTION OF A PREFERRED EMBODIMENT

Generally, the present invention provides a method and apparatus for regulating a DC output voltage of a switch mode converter. The method and apparatus includes processing that begins by comparing a representation of the DC output voltage with a reference voltage to produce a digital stream of comparison data. The comparing is done at a given clock rate such that the digital stream of comparison data is produced at the corresponding clock rate. The processing then continues by interpreting the digital stream of comparison data to produce a digital stream of charged data and load data. The processing continues by interpreting the digital stream of charge data and load data to determine, for a given set of clock cycles, a charge signal and a load signal. The processing then continues by enabling charging of an external element (e.g., an inductor) in accordance with a charge signal for the given set of clock cycles. The processing further includes enabling discharging of the external element to a load (e.g., a capacitor) in accordance with the load signal for the given set of clock cycles. With such a method and apparatus, digital high-speed regulation of a DC output voltage or multiple DC output voltages may be achieved without the limitations of prior art analog regulation schemes (e.g., without linear regulators, without multiple control circuits and inductors, and without complex analog circuitry).

Figure 1:
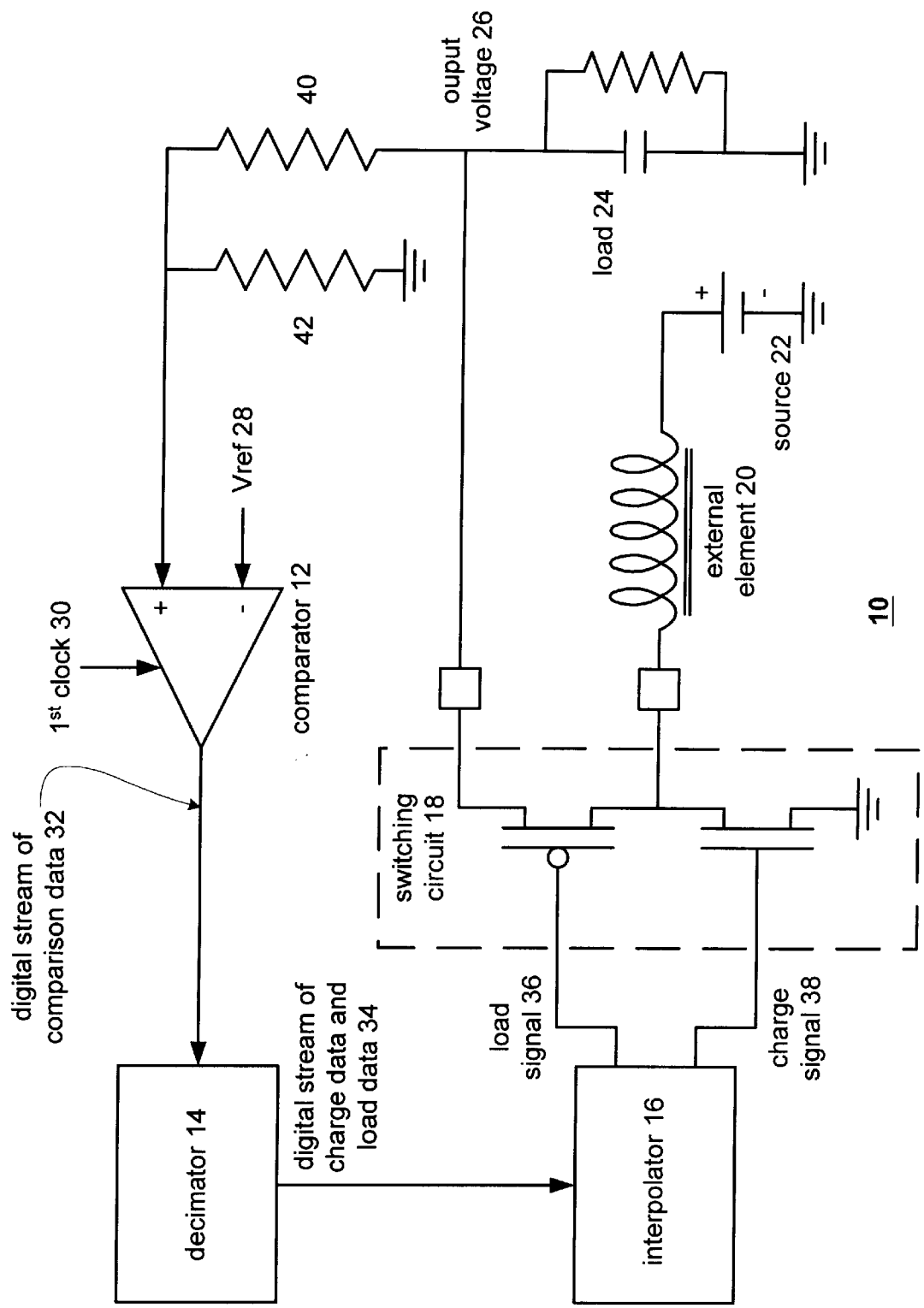
FIG. 1 illustrates a schematic block diagram of a DC to DC converter in accordance with the present invention.

The present invention can be more fully described with reference to FIGS. 1 through 7. FIG. 1 illustrates a schematic block diagram of a switch mode converter 10 that includes a comparator 12, a decimator 14, an interpolator 16, a switching circuit 18, an external element 20, a source 22, and a load 24. The external element 20 may be a device capable of storing and discharging energy. For example, in the illustrated embodiment, the external element 20 is an inductor. The load 24 is also a device that is capable of storing and dissipating energy. In the illustrated example, the load 24 is a capacitor, which may be coupled in parallel to a resistor. The source 22 is shown as a battery, but as one of average skill in the art would readily appreciate, the source 22 may be a DC output from a switch mode power supply or any power supply device that produces DC output voltages.

The load 24 provides the output voltage 26, which may be a DC output. Resistors 40 and 42 provide a divider network such that a representation of the output voltage 26 is provided to comparator 12. The comparator 12 also receives a voltage reference 28. At a given clock rate, which is produced by the first clock 30, the comparator 12 generates a digital stream of comparison data 32. Note that the clock rate and number of cycles processed by the decimator 14, for a given set of cycles, from the comparator 12 is selected to optimize performance and/or circuit complexity.

The decimator 14 is operably coupled to receive the digital stream of comparison data 32 and to produce therefrom a digital stream of charged data and load data 34. As will be discussed in greater detail with respect to the remaining figures, the digital stream of charge data and load data has an interval, or period, that is a multiple of the period of the data stream of comparison data 32. For example, the decimator 14 may output data at a second clock rate, which operates at a rate that is equal to or less than the rate of the first clock 30. The load signal 36 and charge signal 38 are produced at a third clock rate that is equal to or faster than the second clock rate. The ratio between the third and second clock rate defines a set of clock cycles. One embodiment has the first and third clock rates equal to the highest clock rate in the system and the second clock rate at $\frac{1}{32}$ of the first clock rate.

Interpolator 16 is operably coupled to receive the digital stream of charged data and load data 34. From this input, the interpolator 16 produces a load signal 36 and a charge signal 38. As will be discussed in greater detail with reference to FIG. 2, the load signal 36 and charge signal 38 correspond to a particular set of clock cycles of the first clock 30.

When the charge signal 38 is enabled, the N-channel transistor in switching circuit 18 is enabled while the P-channel transistor is disabled. In this configuration, the external device 20 is coupled across the source 22 thus is receiving a current. When the load signal 36 is enabled and the charge signal 38 is disabled, the P-channel of switching circuit 18 is on, while the N-channel transistor of switching circuit 18 is disabled. In this configuration, the external element 20 is coupled to the load 24 and the source 22 such that it is discharging energy into the load 24.

Figure 2:
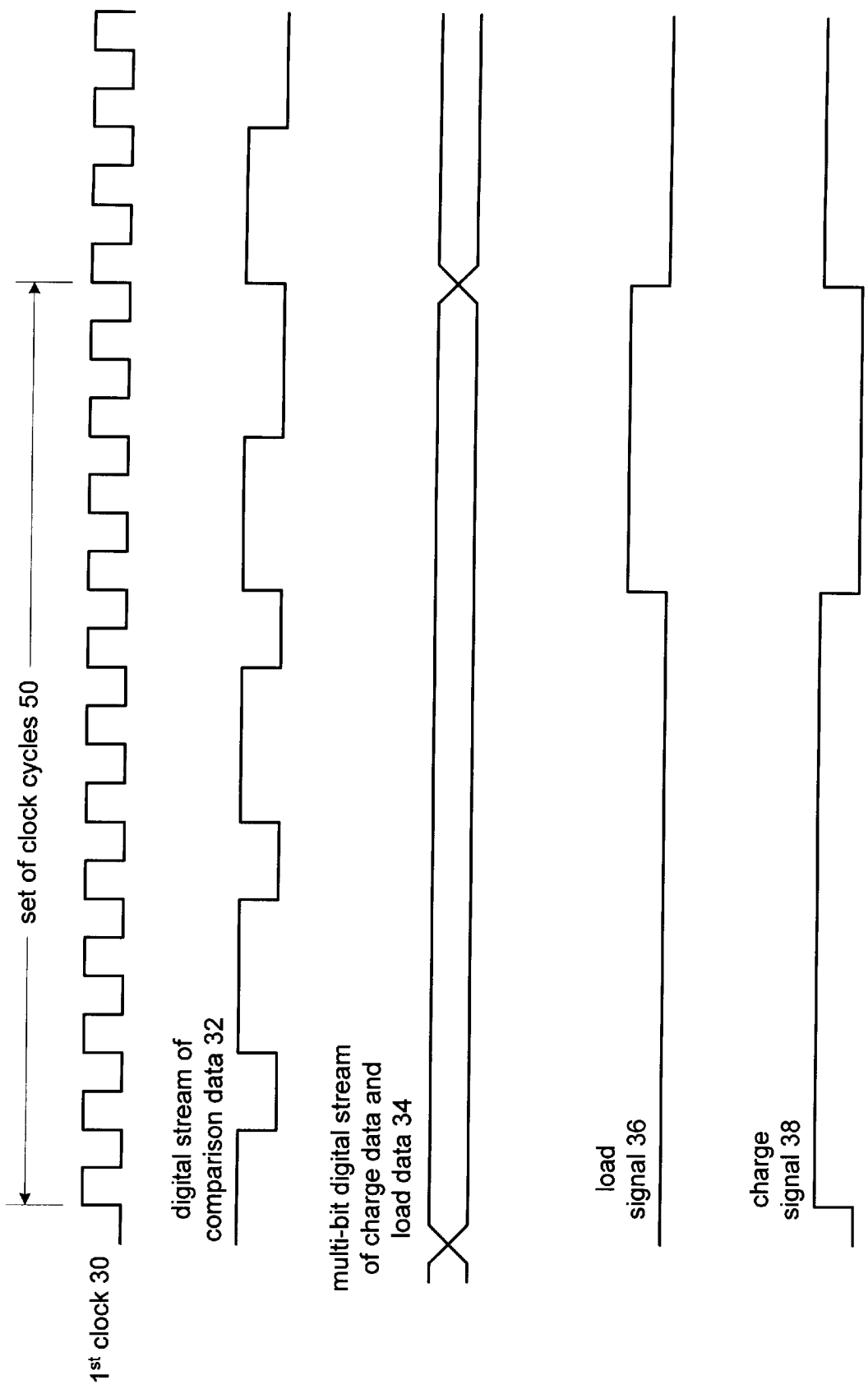
FIG. 2 illustrates a timing diagram of the DC to DC converter of FIG. 1.

FIG. 2 illustrates a timing diagram of the operation of the DC to DC converter 10 of FIG. 1. As shown, the first clock 30, which may be in the hundreds of thousands of cycles per second range or greater, produces a clock signal that includes a set of clock cycles 50. For this illustrative example, 12 clock cycles are included in the set. As one of average skill in the art would appreciate any number of clock cycles may be included in the set of clock cycles to achieve the desired results. Note that the fewer clock cycles in a set of clock cycles, the more quickly the inductor will be charged and discharged thus a smaller inductor may be used and/or, the peak inductor current may be reduced thereby reducing ohmic losses in the switches.

The comparator produces the digital stream of comparison data 32. In this example, the output of the comparator is high for 2 clock cycles and low for one clock cycle throughout the duration of the set of clock cycles 50. Accordingly, the output voltage is higher than the referenced voltage thus the DC output voltage is slightly higher than desired. Under this condition, the inductor needs to carry less average current and therefore needs to be discharged for more time and charged for less time, thereby reducing the energy it stores and subsequently transfers.

From the digital stream of comparison data 32, the decimator 14 generates the multi-bit digital stream of charged data and load data 34 for the set of clock cycles. As shown, the decimator interprets the stream of comparison data 32 to produce the possible multi-bit charge and load data 34 for the corresponding set of clock cycles 50. In this illustration, the ratio between load time and charge time that is digitally encoded in the digital data 34 will increase if the output of the comparator is high more than 50% of the time. Similarly, the ratio between the load time and change time that is digitally encoded in the digital data 34 will decrease if the output of the comparator is high less than 50% of the time.

From the digital stream of charged data and load data 34, interpolator 16 generates the load signal 36 and the charge signal 38. The charge signal 38 is in accordance with the charge information encoded in the charge and load data 34 for the set of clock cycles 50. Similarly, the load signal 36 corresponds to the load information encoded in the charge and load data 34 of the set of clock cycles 50. As such, for this illustration, the inductor will be charged for twice as long as it is discharged. Note that the digital stream of charge data and load data 34 is a digital multi-bit signal that is constant for each set of clock cycles, while the load signal 36 and charge signal 38 are generally not constant for each set of clock cycles. As such, the charge data 38 and load data 36 represent an ongoing function of the relationship of the charge data and load data encoded in the digital data stream 34.

Figure 3:
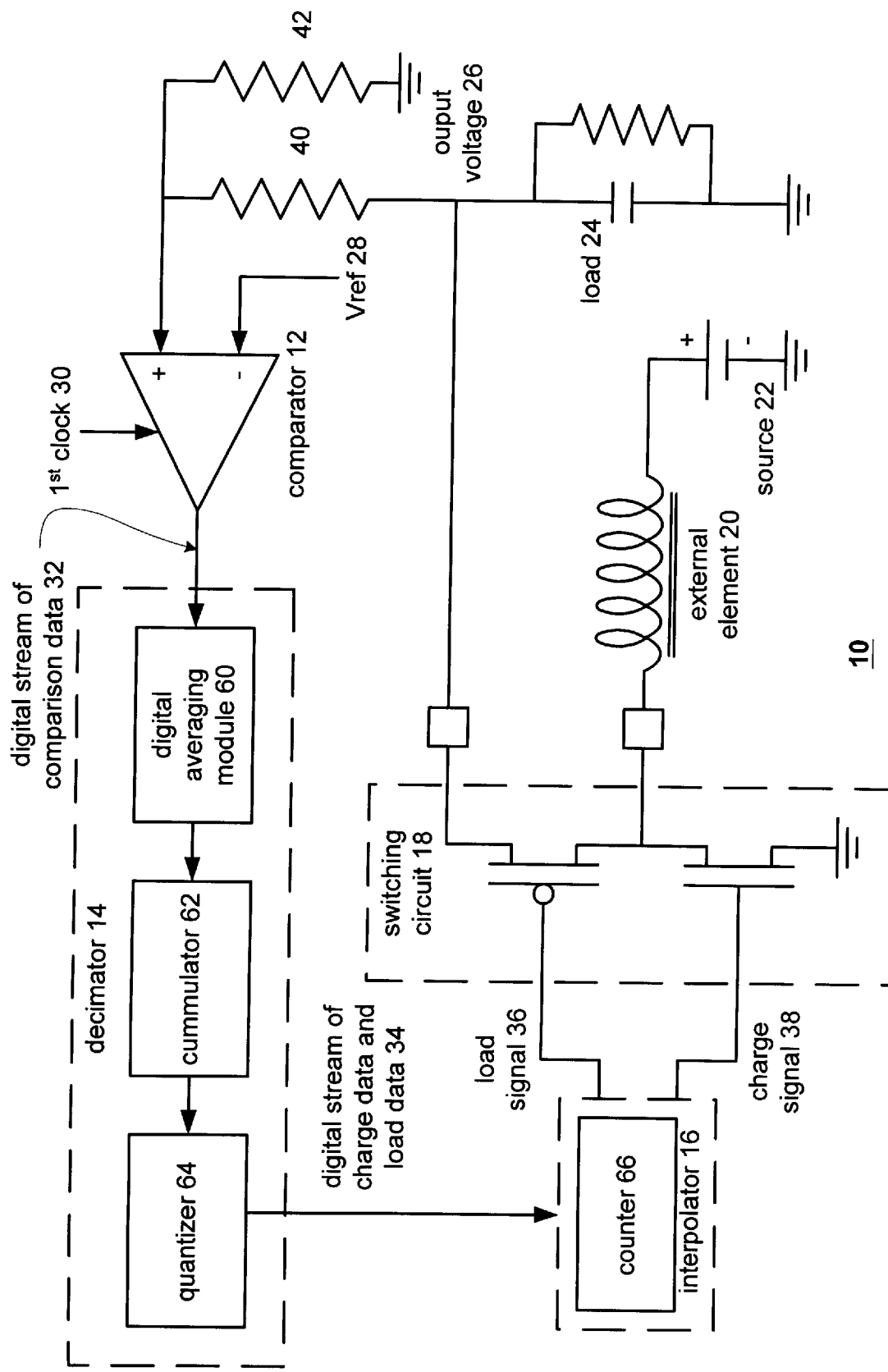
FIG. 3 illustrates a more detailed schematic block diagram of a DC to DC converter in accordance with the present invention.

FIG. 3 illustrates a schematic block diagram of the DC to DC converter 10 in greater detail. As shown, the decimator 14 includes a digital averaging module 60, a cumulator 62, and a quantizer 64. The digital averaging module 60 may be a moving average module that produces an average representation of the digital stream of comparison data 32. The cumulator 62, which may be an integrator produces an ongoing integral of the digital stream of comparison data 32. Alternatively, the cumulator 62 may include other filtering functions to improve the transient performance of the DC to DC converter. The quantizer 64, which may be a Sigma Delta modulator, receives the output of the cumulator 62 and produces the digital stream of charged data and load data 34. In this example, the digital averaging module 60 will operate at the rate of the first clock cycle 30 while the cumulator 62 and quantizer 64 will operate at a fractional clock rate. As one of average skill in the art will appreciate, the cumulator 62 may perform an integration function, a filtering function, and/or an averaging function and the quantizer 64 may be achieved via circuitry other than a sigma-delta modulator.

The interpolator 16 is shown to include a counter 66, which may be clocked by the first clock 30 or another clock source equal to or greater than the fractional clock rate used in the quantizer. In one embodiment, the counter can be configured to count for the number of clock cycles specified in the charge and load data 34 to produce the charge signal 38. The balance of the clock cycles in the given set of clock cycles 50 can be used to assert the load signal 36. Based on this count, the interpolator 16 generates the corresponding load signal 36 and charge signal 38. The remaining functionality of the DC to DC converter 10 of FIG. 3, is as similarly discussed with reference to FIG. 1.

Figure 4:
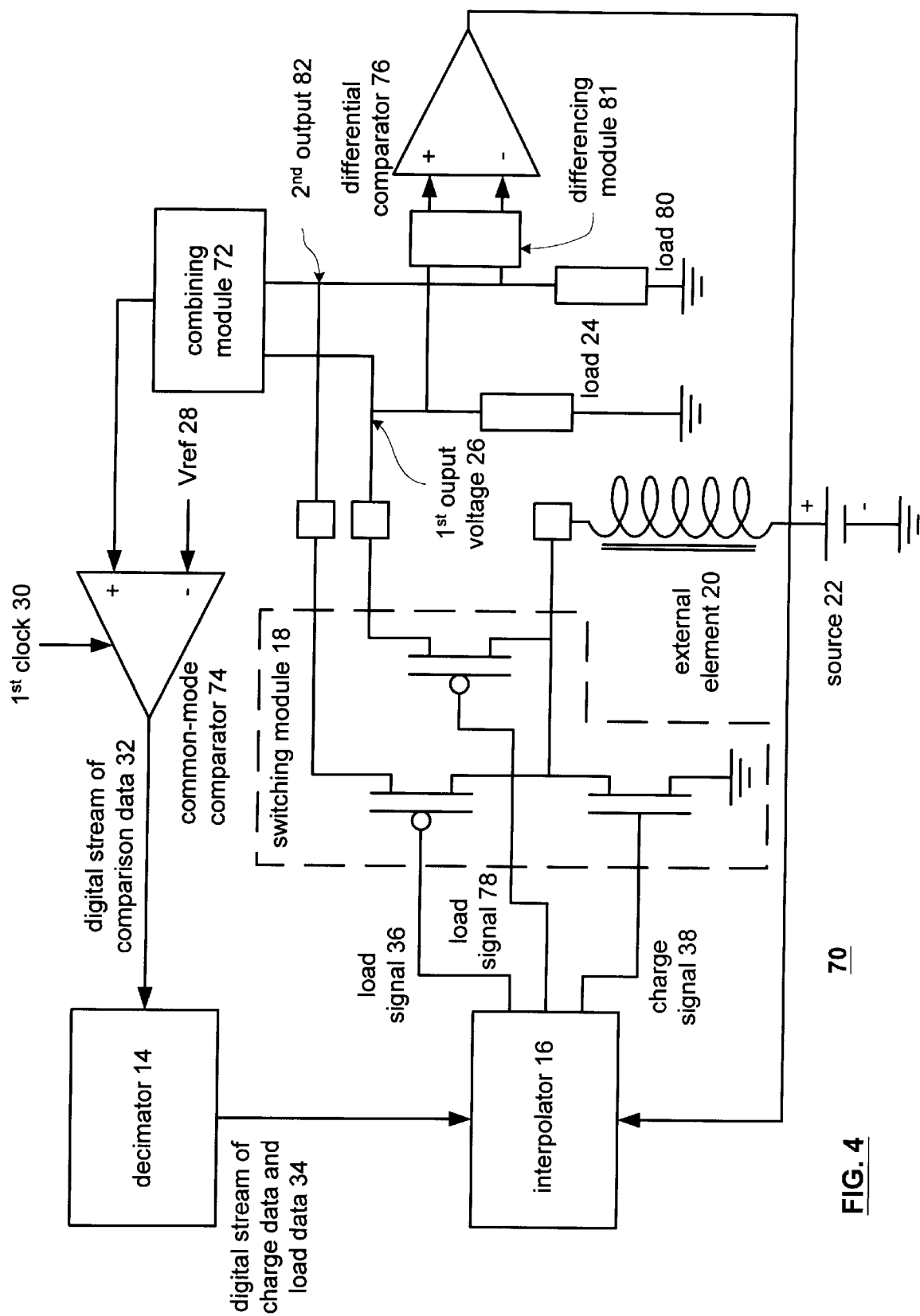
FIG. 4 illustrates a DC to DC converter having multiple DC outputs in accordance with the present invention.

FIG. 4 illustrates a schematic block diagram of a DC to DC converter 70 that includes multiple outputs. The DC to DC converter 70 includes a differential comparator 76, a combining module 72, a common mode comparator 74, the decimator 14, the interpolator 16, an expanded switching module 18, an external element 20, a source 22, a first load 24, a second load 80, and a differencing module 81. Load 24 produces a first output voltage 26 while load 80 produces a second output voltage 82. The combining module 72 receives the first and second output voltages 26 and 82, or representations thereof, and produces a combined output voltage. The combining module 72 may be a resistive network that sums the first and second output voltages 26 and 82 to produce the representative combined voltage. The representative combined voltage is received by the common mode comparator 74, which functions similarly to the comparator 12 of FIG. 1, and produces therefrom the digital stream of comparison data 32. Decimator 14 receives the digital stream of comparison data 32 and produces a digital stream of charged data and load data 34. The interpolator 16 receives the digital stream of charged data and load data 34 and further receives the output of the differential comparator 76. The differencing module 81 receives the first and second voltages 26 and 82 to produce a representation of the first and second voltages. The differential comparator 76 compares the representation of the first and second output voltages 26 and 82 and provides a feedback signal to interpolator 16 indicating whether the first DC output voltage 26 or the second DC output voltage 82 is to be load destination for the external element 20. For example, if the first DC output voltage is lower than the second DC output voltage, then the load signal 78 will be active during the given set of clock cycles.

The interpolator 16, based on the feedback comparator 76 and the digital stream of charge data and load data 34, enables the charge signal 38 and load signal 36 or load signal 78. Accordingly, when the differential comparator 76 provides feedback to interpolator 16 that the first DC output voltage regulator is to be regulated, the interpolator 16 enables the load signal 78. Similarly, when the differential comparator 76 provides feedback to interpolator 16 that the second DC output voltage 82 is to be regulated, the interpolator 16 enables load signal 36. Thus, for any given set of clock cycles, interpolator 16 will enable the charge signal 38 and either load signal 78 or load signal 36.

When charge signal 38 is active, the external element 20 is operably coupled across source 22 and is receiving a charge current. When load signal 36 is enabled, load signal 78 will be disabled, such that the external element 20 is discharged into load 80. When load signal 78 is enabled, the external element 20 will discharge into load 24. In this manner, a single external inductor, and a single regulation circuit may be used to accurately regulate two or more DC output voltages. Note that when the first clock 30 is of a significant rate, (e.g., in the 100 kilohertz plus range), the ripple on loads 24 and 90 are minimized such that a single external element 20 may be utilized.

Figure 5:
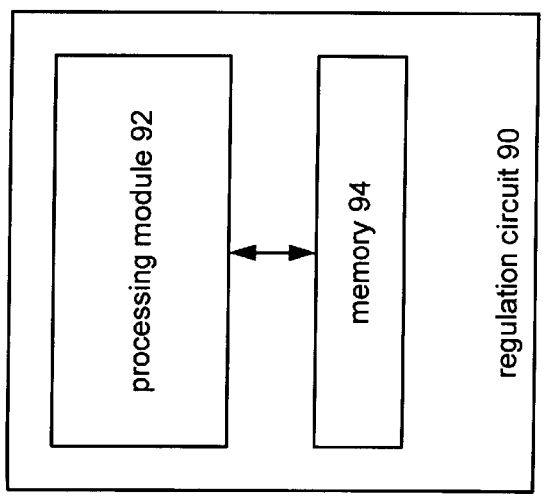
FIG. 5 illustrates a schematic block diagram of a regulation circuit in accordance with the present invention.

FIG. 5 illustrates a schematic block diagram of a regulation circuit 90 that includes a processing module 92 and memory 94. The processing module 92 may be a single processing device or a plurality of processing devices. Such a processing device may be a microprocessor, microcontroller, digital signal processor, state machine and/or logic circuitry, and/or any device that processes signals (analog or digital) based on operational instructions. The memory 94 may be a single memory device or a plurality of memory devices that store operational instructions executed by the processing module 92. Such a memory device may be a random access memory, read-only memory, floppy disk, hard drive memory, and/or any device that stores digital information. Note that when the processing module 92 implements one or more of its functions utilizing at a state machine or logic circuitry, the memory storing the corresponding operational instructions is embedded within the circuitry comprising the state machine or logic circuit. The operational instructions executed by regulation circuit 90 are illustrated in FIGS. 6 and/or 7.

Figure 6:
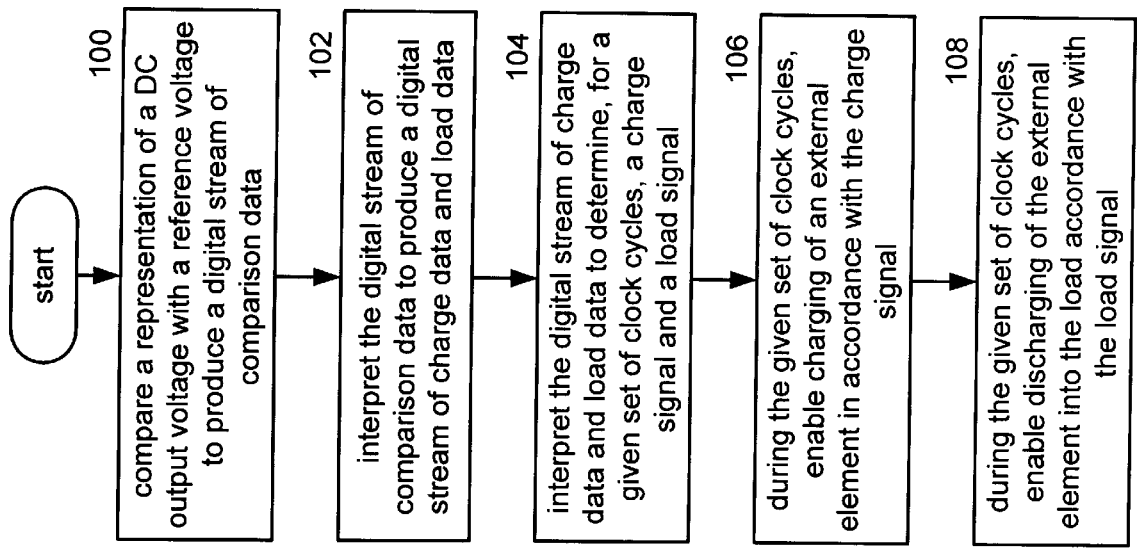
FIG. 6 illustrates a logic diagram of a method for regulating a DC output voltage in accordance with the present invention.

FIG. 6 illustrates a logic diagram of a method for regulating a DC output of a switch mode converter. The process begins at step 100 where a representation of a DC output voltage is compared with a reference voltage to produce a digital stream of comparison data. Note that the comparison is done at a first clock rate where subsequent steps will be done at a second clock rate that is less than the first clock rate. For example, the comparator 12 may operate at a higher clock rate than decimator 14 or interpolator 16.

The process then proceeds to step 102 where the digital stream of comparison data is interpreted to produce a digital stream of charge data and load data. The process then proceeds to step 104 where the digital stream of charge data and load data is interpreted to determine, for a given set of clock cycles, a charge signal and a load signal. For example, the interpretation of the digital stream of comparison data may be done, for the given set of clock cycles, by determining an average digital value for the digital stream of comparison data. The interpretation further includes cumulating, based on a cumulation function, such as integration, filtering, and/or averaging, the average digital value with a current cumulative value to produce an updated cumulative value. Such interpretation further includes quantizing the updated cumulative value to produce the digital stream of charge data and load data. When the interpretation of the digital stream of comparison data is performed in this manner, the interpretation of the digital stream of charge data and load data may include the interpreting the digital stream of charge data and load data to produce a time-quantized charge signal and a time-quantized load signal as the charge signal and load signal, respectively. Note that this could be done using a parallel to serial operation on the charge and load data to produce the charge signal and load signal.

Alternatively, the interpretation of the digital stream of comparison data may be done by cumulating, based on a cumulating function (e.g., integration, filtering, and/or averaging), the digital stream of comparison data with a current cumulative value to produce an updated cumulative value. The interpretation would then include quantizing the updated cumulative value to produce the digital stream of charged data and load data. With reference to FIG. 3, decimator 14 may or may not include a digital averaging module 70. Note that if the interpretation of the digital stream of comparison data is done in this manner, a time quantized charge signal and a time quantized load signal are produced as the charge signal and load signal respectively.

The process then proceeds to step 106 where, during the given set of clock cycles, charging of an external element is enabled in accordance with the charged signal. Note that the external element may be an inductor. The process then proceeds to step 108 where, during the same set of clock cycles, discharging of the external element is enabled into the load in accordance with the load signal. Note that the load may be a capacitor with an optional resistor in parallel.

Figure 7:
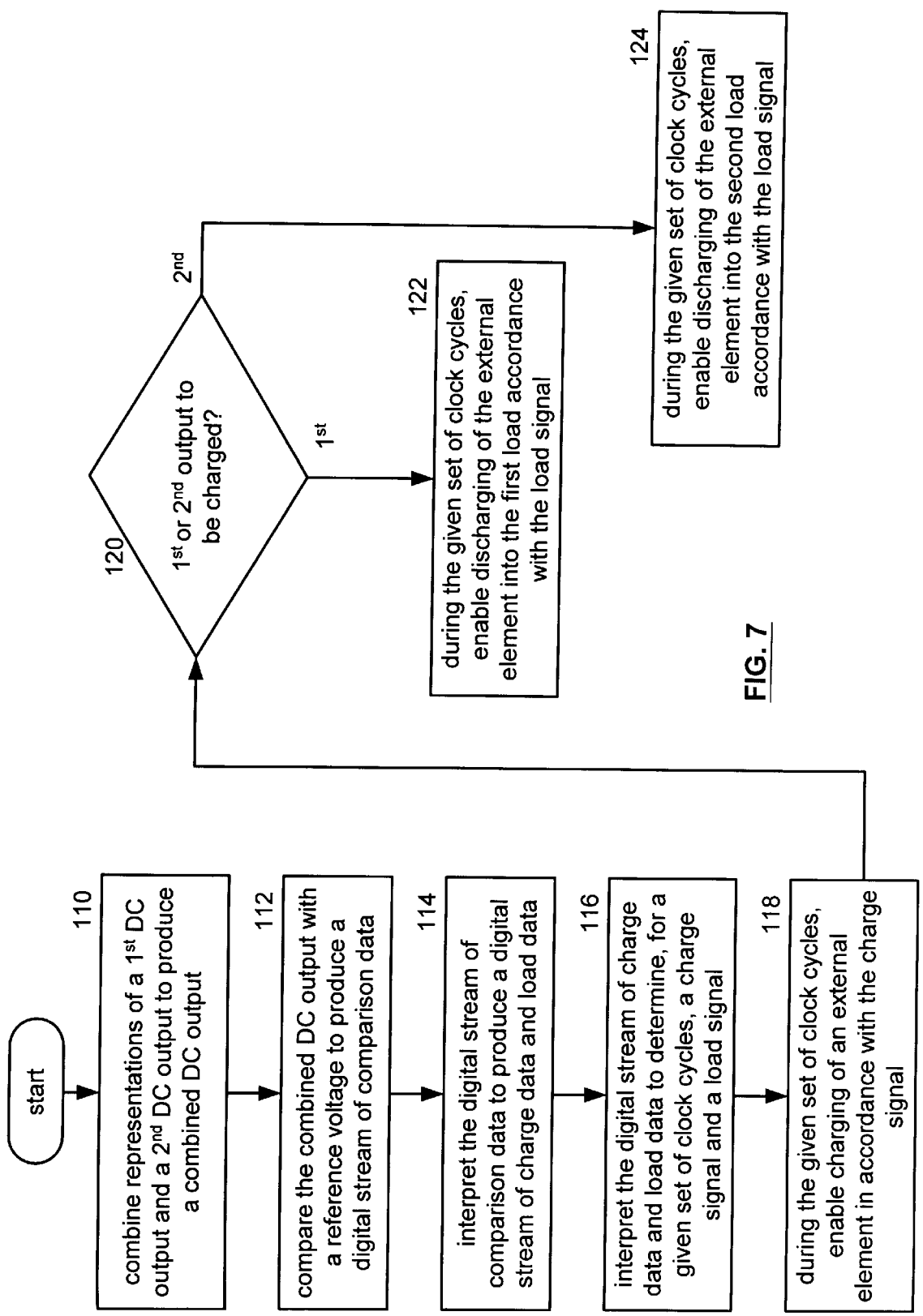
FIG. 7 illustrates a logic diagram of an alternate method for regulating multiple DC output voltages in accordance with the present invention.

FIG. 7 illustrates a diagram of a method for regulating multiple DC output voltages. The process begins at step 110 where first and second DC output voltages are combined to produce a combined DC output voltage. The process then proceeds to step 112 where the combined DC output voltages are compared with a reference voltage to produce a digital stream of comparison data. The process then proceeds to step 114 where the digital stream of comparison data is interpreted to produce a digital stream of charged data and load data. The process then proceeds to step 116 where the digital stream of charged data and load data is interpreted to determine, for a given set of clock cycles, a charge signal and a load signal. The process then proceeds to step 118 where, during the given set of clock cycles, charging of an external element is enabled in accordance with the charge signal.

The process then proceeds to step 120 where a determination is made as to whether the first or second DC output voltage is to be regulated (i.e., charged with the external element). When the first output voltage is to be regulated, the process proceeds to step 122. At step 122, the discharging of the external element is enabled into a first load in accordance with the load signal for the given set of clock cycles. When it is determined at step 120 that the second output is to be regulated, the process proceeds to step 124. At step 124, for the given set of clock cycles, discharging of the external element into a second load is enabled in accordance with the load signal.

The preceding discussion has presented a method and apparatus for regulating a DC output voltage or multiple DC output voltages from a single external element, such as an inductor, with a single regulation circuit. The single regulation circuit is a digital circuit thus does not have the limitations of prior art analog control circuits. In addition, by utilizing the digital control circuit of the present invention, multiple DC outputs may be accurately regulated from a single inductor. As one of average skill in the art would readily appreciate, other embodiments may be derived from the teaching of the present invention without deviating from the scope of the claims.

What is claimed is:

1. A method for regulating an output voltage of a switch mode converter, the method comprises the steps of:
    a) comparing a representation of the output voltage with a reference voltage to produce a digital stream of comparison data;
    b) interpreting the digital stream of comparison data to produce a digital stream of charge data and load data;
    c) interpreting the digital stream of charge data and load data to determine, for a given set of clock cycles, a charge signal and a load signal;
    d) during the given set of clock cycles, enabling charging of an external element in accordance with the charge signal; and
    e) during the given set of clock cycles, enabling discharging of the external element to a load in accordance with the load signal.

2. The method of claim 1, wherein the interpreting the digital stream of comparison data further comprises:
    for the given set of clock cycles, determining an average digital value for the digital stream of comparison data;
    cumulating, based on a cumulating function, the average digital value with a current cumulative value to produce an updated cumulative value; and
    quantizing the updated cumulative value to produce the digital stream of charge data and load data.

3. The method of claim 2, wherein the interpreting the digital stream of charge data and load data further comprises interpreting the digital stream of charge data and load data to produce a time quantized charge signal and a time quantized load signal as the charge signal and the load signal, respectively.

4. The method of claim 1, wherein the interpreting the digital stream of comparison data further comprises:
    cumulating, based on a cumulating function, the digital stream of comparison data with a current cumulative value to produce an updated cumulative value; and
    quantizing the updated cumulative value to produce the digital stream of charge data and load data.

5. The method of claim 4, wherein the interpreting the digital stream of charge data and load data further comprises interpreting the digital stream of charge data and load data to produce a time quantized charge signal and a time quantized load signal as the charge signal and the load signal, respectively.

6. The method of claim 1 further comprises:
    within step (a), comparing a representation of a first DC output voltage and a representation of a second DC output voltage with the reference voltage to produce the digital stream of comparison data;
    within step (c), determining whether the first or the second DC output voltage is to be charged during the given set of clock cycles;
    within step (e), enabling discharging of the external element to a first load when the first DC output voltage is to be charged and enabling discharging of the external element to a second load when the second DC output voltage is to be charged.

7. The method of claim 1, wherein the enabling charging of an external element further comprises enabling charging of an inductor.

8. The method of claim 1, wherein the enabling discharging of the external element to the load further comprises discharging to a capacitor.

9. The method of claim 1, wherein the comparing the representation of the DC output voltage with the reference voltage further comprises producing the digital stream of comparison data at a first clock rate, wherein the interpreting the digital stream of comparison data produces the digital stream of charge data and load data at a second clock rate, wherein the first clock rate is greater than, or equal to, the second clock rate.

10. A method for regulating multiple output voltages of a switch mode converter, the method comprises the steps of:
    a) combining a representation of a first output voltage and a representation of a second output voltage to produce a combined output voltage;
    b) comparing the combined output voltage with a reference voltage to produce a digital stream of comparison data;
    c) interpreting the digital stream of comparison data to produce a digital stream of charge data and load data;
    d) interpreting the digital stream of charge data and load data to determine, for a given set of clock cycles, a charge signal and a load signal;
    e) during the given set of clock cycles, enabling charging of an external element in accordance with the charge signal;
    f) determining whether, for the given set of clock cycles, the first or the second output voltage is to be charged; and
    g) during the given set of clock cycles, enabling discharging of the external element to a first load in accordance with the load signal when the first output is to be charged and enabling discharging of the external element to a second load in accordance with the load signal when the second output is to be charged.

11. The method of claim 10, wherein the interpreting the digital stream of comparison data further comprises:

for the given set of clock cycles, determining an average digital value for the digital stream of comparison data;

cumulating, based on a cumulating function, the average digital value with a current cumulative value to produce an updated cumulative value; and quantizing the updated cumulative value to produce the digital stream of charge data and load data.

12. The method of claim 11, wherein the interpreting the digital stream of charge data and load data further comprises interpreting the digital stream of charge data and load data to produce a time quantized charge signal and a time quantized load signal as the charge signal and the load signal, respectively.

13. The method of claim 10, wherein the interpreting the digital stream of comparison data further comprises:

cumulating, based on a cumulating function, the digital stream of comparison data with a current cumulative value to produce an updated cumulative value; and quantizing the updated cumulative value to produce the digital stream of charge data and load data.

14. The method of claim 13, wherein the interpreting the digital stream of charge data and load data further comprises interpreting the digital stream of charge data and load data to produce a time quantized charge signal and a time quantized load signal as the charge signal and the load signal, respectively.

15. A regulation circuit for regulating an output voltage of a switch mode converter, the regulation circuit comprising:

a comparator operably coupled to compare a representation of the output voltage with a reference voltage at a first clock rate to produce a digital stream of comparison data;

a decimator operably coupled to receive the digital stream of comparison data, wherein the decimator interprets the digital stream of comparison data to produce a digital stream of charge data and load data;

an interpolator operably coupled to receive the digital stream of charge data and load data, wherein the interpolator interprets the digital stream of charge data and load data to produce, for a given set of clock cycles, a charge signal and a load signal; and switching circuit operably coupled to receive the charge signal and the load signal, wherein the switching circuit couples an external element to a source for charging in accordance with the charge signal and couples the external element to a load in accordance with the load signal.

16. The regulation circuit of claim 15, wherein the decimator comprises:

a cumulator operably coupled to receive the digital stream of comparison data, wherein the cumulator performs a cumulating function upon the digital stream of comparison data and a current cumulative value to produce an updated cumulative value; and a quantizer operably coupled to receive the updated cumulative value to produce the digital stream of charge data and load data.

17. The regulation circuit of claim 16, wherein the interpolator comprises:

a counter operably coupled to receive the digital stream of charge data and load data, wherein the counter counts a number of clock cycles based on value of charge data within the digital stream of charge data and load data to produce the charge signal for the given set of clock cycles and produces the load signal based on the charge data and the given set of clock cycles.

18. The regulation circuit of claim 15, wherein the comparator further comprises:

a combining module operably coupled to combine the representation of the output voltage with a representation of a second output voltage to produce a combined output voltage;

a common-mode comparison module operably coupled to compare the combined output voltage with the reference voltage to produce the digital stream of comparison data; and a differential comparison module operably coupled to compare the representation of the output voltage with the representation of the second output voltage to determine whether the output voltage or the second output voltage will be charged during the given set of clock cycles.

19. The regulation circuit of claim 18, wherein the switching circuit comprises:

a first switch operably coupled to couple the external element to the source for charging in accordance with the charge signal;

a second switch operably coupled to couple the external element to the load in accordance with the load signal when the output voltage is to be charged during the given set of clock cycles; and a third switch operably coupled to couple the external element to a second load in accordance with the load signal when the second output voltage is to be charged during the given set of clock cycles.

20. A switch mode converter comprises:

an inductor;

an impedance load that supplies an output voltage;

a feedback circuit operably coupled to the impedance load and to produce a representation of the output voltage;

a comparator operably coupled to compare the representation of the output voltage with a reference voltage at a first clock rate to produce a digital stream of comparison data;

a decimator operably coupled to receive the digital stream of comparison data, wherein the decimator interprets the digital stream of comparison data to produce a digital stream of charge data and load data;

an interpolator operably coupled to receive the digital stream of charge data and load data, wherein the interpolator interprets the digital stream of charge data and load data to produce, for a given set of clock cycles, a charge signal and a load signal; and switching circuit operably coupled to receive the charge signal and the load signal, wherein the switching circuit couples the inductor to a voltage source for charging in accordance with the charge signal and couples the external element to the capacitive load in accordance with the load signal.

21. The switch mode converter of claim 20 further comprises:

a second impedance load that supplies a second output voltage;

a second feedback circuit operably coupled to the second impedance load and to produce a representation of the second output voltage;

a combining module operably coupled to receive the representation of the output voltage and the representation of the second output voltage to produce a combined output voltage that is provided to the decimator; and a differential comparator operably coupled to compare the output voltage with the representation of the second DC voltage to determine, for the given set of clock cycles, whether the first or the second output voltage is to be charged during the given set of clock cycles.

22. The switch mode converter of claim 20, wherein the decimator comprises:

a cumulator operably coupled to receive the digital stream of comparison data, wherein the cumulator performs a cumulating function upon the digital stream of comparison data and a current cumulative value to produce an updated cumulative value; and a quantizer operably coupled to receive the updated cumulative value to produce the digital stream of charge data and load data.

23. The switch mode converter of claim 22, wherein the interpolator comprises:

a counter operably coupled to receive the digital stream of charge data and load data, wherein the counter counts a number of clock cycles based on the charge data within the digital stream of charge data and load data to produce the charge signal for the given set of clock cycles and produces the load signal based on the charge signal and the given set of clock cycles.

24. An apparatus for regulating a DC output voltage of a switch mode converter, the apparatus comprises:

a processing module; and memory operably coupled to the processing module, wherein the memory stores operational instructions that cause the processing module to: (a) compare a representation of the output voltage with a reference voltage to produce a digital stream of comparison data; (b) interpret the digital stream of comparison data to produce a digital stream of charge data and load data; (c) interpret the digital stream of charge data and load data to determine, for a given set of clock cycles, a charge signal and a load signal; (d) during the given set of clock cycles, enable charging of an external element in accordance with the charge signal; and (e) during the given set of clock cycles, enable discharging of the external element to a load in accordance with the load signal.

25. The apparatus of claim 24, wherein the memory further comprises operational instructions that cause the processing module to interpret the digital stream of comparison data by:

for the given set of clock cycles, determining an average digital value for the digital stream of comparison data;

cumulating, based on a cumulating function, the average digital value with a current cumulative value to produce an updated cumulative value; and quantizing the updated cumulative value to produce the digital stream of charge data and load data.

26. The apparatus of claim 25, wherein the memory further comprises operational instructions that cause the processing module to interpret the digital stream of charge data and load data by interpreting the digital stream of charge data and load data to produce a time quantized charge signal and a time quantized load signal as the charge signal and the load signal, respectively.

27. The apparatus of claim 24, wherein the memory further comprises operational instructions that cause the processing module to interpret the digital stream of comparison data by:

cumulating, based on a cumulating function, the digital stream of comparison data with a current cumulative value to produce an updated cumulative value; and quantizing the updated cumulative value to produce the digital stream of charge data and load data.

28. The apparatus of claim 27, wherein the memory further comprises operational instructions that cause the processing module to interpret the digital stream of charge data and load data by interpreting the digital stream of charge data and load data to produce a time quantized charge signal and a time quantized load signal as the charge signal and the load signal, respectively.

29. An apparatus for regulating multiple output voltages of a switch mode converter, the apparatus comprises:

a processing module; and memory operably coupled to the processing module, wherein the memory stores operational instructions that cause the processing module to: (a) combine a representation of a first output voltage and a representation of a second output voltage to produce a combined output voltage; (b) compare the combined output voltage with a reference voltage to produce a digital stream of comparison data; (c) interpret the digital stream of comparison data to produce a digital stream of charge data and load data; (d) interpret the digital stream of charge data and load data to determine, for a given set of clock cycles, a charge signal and a load signal; (e) during the given set of clock cycles, enable charging of an external element in accordance with the charge signal; (f) determine whether, for the given set of clock cycles, the first or the second output voltage is to be charged; and (g) during the given set of clock cycles, enable discharging of the external element to a first load in accordance with the load signal when the first output is to be charged and enable discharging of the external element to a second load in accordance with the load signal when the second output is to be charged.

30. The apparatus of claim 29, wherein the memory further comprises operational instructions that cause the processing module to interpret the digital stream of comparison data by:

for the given set of clock cycles, determining an average digital value for the digital stream of comparison data;

cumulating, based on a cumulating function (integration, filtering, averaging), the average digital value with a current cumulative value to produce an updated cumulative value; and quantizing the updated cumulative value to produce the digital stream of charge data and load data.

31. The apparatus of claim 30, wherein the memory further comprises operational instructions that cause the processing module to interpret the digital stream of charge data and load data by interpreting the digital stream of charge data and load data to produce a time quantized charge signal and a time quantized load signal as the charge signal and the load signal, respectively.

32. The apparatus of claim 29, wherein the memory further comprises operational instructions that cause the processing module to interpret the digital stream of comparison data by:

cumulating, based on a cumulating function, the digital stream of comparison data with a current cumulative value to produce an updated cumulative value; and quantizing the updated cumulative value to produce the digital stream of charge data and load data.

33. The apparatus of claim 29, wherein the memory further comprises operational instructions that cause the processing module to interpret the digital stream of charge data and load data by interpreting the digital stream of charge data and load data to produce a time quantized charge signal and a time quantized load signal as the charge signal and the load signal, respectively.

34. An output stage of a DC to DC converter comprises:
   a first transistor, when enabled, operably coupled to discharge an external element into a first load to produce a first output;
   a second transistor, when enabled, operably coupled to discharge the external element into a second load to produce a second output; and
   a third transistor, when enabled, operably coupled to charge the external element from a power source.

35. The output stage of the DC to DC converter of claim 34 further comprises:
   a regulation circuit for regulating the first and second outputs, wherein the regulation circuit includes:
      a first comparator operably coupled to compare a representation of the first and second outputs with a reference voltage at a first clock rate to produce a digital stream of comparison data;
      a decimator operably coupled to receive the digital stream of comparison data, wherein the decimator interprets the digital stream of comparison data to produce a digital stream of charge data and load data;
      an interpolator operably coupled to receive the digital stream of charge and load data, wherein the interpolator interprets the digital stream of charge data and load data to produce, for a given set of clock cycles, a charge signal and a load signal;
      a second comparator operably coupled to compare a representation of the first output to a representation of the second output to produce a load selection signal; and
   switching circuit operably coupled to receive the charge signal, the load signal, and the load selection signal, wherein the switching circuit enables the first, second and third transistors.

* * * * *